United States Patent
Reineke

(10) Patent No.: US 11,027,472 B2
(45) Date of Patent: Jun. 8, 2021

(54) TYRE STRIP EXTRUSION APPARATUS FOR PRODUCING TREAD AND/OR SIDE STRIPS FOR TYRES, AND METHOD FOR PRODUCING A TREAD OR SIDE STRIP OF A TYRE

(71) Applicant: KRAUSSMAFFEI BERSTORFF GMBH, Hannover (DE)

(72) Inventor: Frank Reineke, Ronnenberg (DE)

(73) Assignee: KRAUSSMAFFEI BERSTORFF GMBH, Hannover (DE)

(*) Notice: Subject to any disclaimer, the term of this patent is extended or adjusted under 35 U.S.C. 154(b) by 639 days.

(21) Appl. No.: 15/576,547

(22) PCT Filed: May 18, 2016

(86) PCT No.: PCT/EP2016/061070
§ 371 (c)(1),
(2) Date: Nov. 22, 2017

(87) PCT Pub. No.: WO2016/192988
PCT Pub. Date: Dec. 8, 2016

(65) Prior Publication Data
US 2018/0147769 A1 May 31, 2018

(30) Foreign Application Priority Data

Jun. 2, 2015 (DE) ...................... 10 2015 108 707.3

(51) Int. Cl.
*B29C 48/49* (2019.01)
*B29C 48/305* (2019.01)
(Continued)

(52) U.S. Cl.
CPC .............. *B29C 48/08* (2019.02); *B29C 48/07* (2019.02); *B29C 48/21* (2019.02);
(Continued)

(58) Field of Classification Search
CPC ....... B29C 48/08; B29C 48/185; B29C 48/19; B29C 48/20; B29C 48/21; B29C 48/2562;
(Continued)

(56) References Cited

U.S. PATENT DOCUMENTS 4,556,376 A * 12/1985 Sievers et al.
2005/0271761 A1 12/2005 Ohki et al.
(Continued)

FOREIGN PATENT DOCUMENTS

DE 36 38 623 10/1987
DE 37 09 248 7/1988
(Continued)

OTHER PUBLICATIONS

English Machine Translation of JP 6-210702, Aug. 2, 1994 (Year: 1994).*

(Continued)

*Primary Examiner* — Xiao S Zhao
*Assistant Examiner* — Joseph S Leyson
(74) *Attorney, Agent, or Firm* — Henry M. Feiereisen LLC

(57) ABSTRACT

A tyre strip extrusion apparatus includes extruders and an extrusion head which includes a head housing having feed openings respectively connected to the extruders for feed of extrusion material. An injection moulding tool is connected to the head housing and includes a profile plate formed with an outlet opening which communicates with the feed openings for extrusion material to flow from the feed openings to the outlet opening for extruding a web from the extrusion material. Bearing against the head housing along a first parting surface is a first distributor plate. A second distributor plate is arranged upstream of the profile plate in flow direction of the extrusion material. The first distributor plate bears along a second parting surface against the second (Continued)

distributor plate. The first and second distributor plates are configured such that at least a majority of the material paths runs through the first and second parting surfaces.

14 Claims, 6 Drawing Sheets

(51) Int. Cl.
*B29C 48/07* (2019.01)
*B29C 48/21* (2019.01)
*B29C 48/495* (2019.01)
*B29C 48/08* (2019.01)
*B29C 48/395* (2019.01)
*B29C 48/25* (2019.01)
*B29L 30/00* (2006.01)

(52) U.S. Cl.
CPC ...... *B29C 48/2562* (2019.02); *B29C 48/2566* (2019.02); *B29C 48/25686* (2019.02); *B29C 48/307* (2019.02); *B29C 48/397* (2019.02); *B29C 48/49* (2019.02); *B29C 48/495* (2019.02); *B29L 2030/002* (2013.01); *B29L 2030/007* (2013.01)

(58) Field of Classification Search
CPC .......... B29C 48/2566; B29C 48/25686; B29C 48/30; B29C 48/307; B29C 48/397; B29C 48/49; B29C 48/495; B29C 48/505; B29C 48/705; B29C 48/71
See application file for complete search history.

(56) References Cited

U.S. PATENT DOCUMENTS

2013/0154144 A1* 6/2013 Ripple
2013/0156876 A1 6/2013 Schnabel

FOREIGN PATENT DOCUMENTS

| DE | 10 2011 111 463 | 2/2012 |
| DE | 10 2012 111 439 | 5/2014 |
| EP | 1 604 802 | 12/2005 |
| JP | H06-210702 | 8/1994 |
| JP | 2001-47494 | 2/2001 |
| WO | WO 2015/032381 | 3/2015 |

OTHER PUBLICATIONS

International Search Report dated Aug. 17, 2016 by the European Patent Office in International Application PCT/EP2016/061070.
"Tyre technology for effective production Multiplex Extrusion Lines Engineering Value", pp. 1-16, Sep. 27, 2013, XSP055296119.

* cited by examiner

TYRE STRIP EXTRUSION APPARATUS FOR PRODUCING TREAD AND/OR SIDE STRIPS FOR TYRES, AND METHOD FOR PRODUCING A TREAD OR SIDE STRIP OF A TYRE

CROSS-REFERENCES TO RELATED APPLICATIONS

This application is the U.S. National Stage of International Application No. PCT/EP2016/061070, filed May 18, 2016, which designated the United States and has been published as International. Publication No. WO 2016/192988 and which claims the priority of German Patent Application, Serial No. 10 2015 108 707.3, filed Jun. 2, 2015, pursuant to 35 U.S.C. 119(a)-(d).

BACKGROUND OF THE INVENTION

The invention relates to a tyre strip extrusion apparatus for producing tread and/or side strips for tyres, having (a) a first extruder which has at least one first screw with a first screw longitudinal axis, (b) a second extruder which has at least one second screw with a second screw longitudinal axis, (c) a third extruder which has at least one third screw with a third screw longitudinal axis, (d) at least one fourth extruder which has at least one fourth screw with a fourth screw longitudinal axis, and (e) an extrusion head with (i) a head housing which has at least four feed openings which are connected to in each case one associated extruder for the feed of extrusion material, and (ii) having an injection moulding tool for the moulding of an extruded web from the extrusion materials, which injection moulding tool is connected to the head housing, has an outlet opening and is arranged such that extrusion material fed through the feed openings can be conducted along a respective material path to the outlet opening, wherein at least the majority of the extruders are constructed around the head housing such that the screws of the respective extruders are removable by means of a movement of the screw through the head housing, while the head housing is stationary relative to the extruders, and wherein the injection moulding tool has a profile plate on which the outlet opening is formed.

According to a second aspect, the invention relates to a method for producing a tread- or side strip of a tyre. The invention additionally relates to a method for producing a tyre, in which a tread- or side strip which is produced in such a way is used.

Such a tyre strip extrusion apparatus is used in order to produce tread- or side strips for tyres. Such tyre strip extrusion apparatuses, compared to other extrusion apparatuses, are designed for the extruding of rubber to a solid strip with a high throughput. Thus, tyre strip extrusion apparatuses are often designed so that they can produce at least 1500 kg tyre strips per hour. This leads to a very high throughput of rubber through the injection moulding tool.

In order to achieve the great throughput, large extruders are used, which means that the extruders which are used have a relatively large screw diameter. Smaller screw diameters are disadvantageous, because large throughputs can only be achieved with small extruders when the latter are operated at a high rotational speed. However, this increases the shear loading of the rubber and increases the risk of a premature vulcanization, which must be avoided.

Compared to small extruders, large extruders have a low efficiency with a high injection pressure. Attempts are therefore made to keep the flow resistance in the extrusion head as small as possible.

A disadvantage in known tyre strip extrusion apparatuses is that they are comparatively complex and are difficult to clean.

A disadvantage, in addition, is that complex tyre strips can not be manufactured.

SUMMARY OF THE INVENTION

The invention is based on the problem of reducing disadvantages in the prior art.

The invention solves the problem through a generic tyre strip extrusion apparatus, in which the injection moulding tool has a first distributor plate and at least one second distributor plate, which is arranged upstream of the profile plate relative to a material path of the extrusion material, that the first distributor plate bears, along a first parting surface, against the head housing and bears, along a second parting surface, against the second distributor plate, and that the distributor plates are designed such that at least a majority of all material paths, in particular all material paths, run through all of the parting surfaces.

According to a second aspect, the invention solves the problem by a generic method, in which a tyre strip extrusion apparatus according to the invention is used.

An advantage in the invention is that the extrusion head is very easy to clean. Therefore, it is merely necessary to remove the distributor plates and clean them. Unlike in the case of known extrusion apparatuses, which have foldable tool inserts, this is possible quickly and simply, with little structural effort.

A further advantage of the invention is that tyre strips having a complex configuration can be extruded. In known tyre strip extrusion apparatuses, the extrusion head has pivotable tool inserts. Such pivotable tool inserts can, however, only be constructed with difficulty so that more than 6, 7 or even 8 types of extrusion material can be fed and formed into the tyre strip. Through the presence of the distributor plates, several different material paths can be formed for extrusion material.

It would have been expected that through the provision of the distributor plates, such a high injection pressure becomes necessary that the accompanying loss of efficiency and the additional inner friction of the rubber, resulting therefrom, leads to premature complete vulcanization. However, it has been found that through the use of a plurality of smaller extruders it is possible to achieve the necessary throughputs for the production of tyre strips, without a premature complete vulcanization occurring.

Within the present description, a tyre strip extrusion apparatus is understood to mean an apparatus which, during operation, produces tyre strips. A tyre strip is understood to mean a tread- or side strip of a tyre.

The head housing is understood to mean in particular the part of the extrusion head which is securely connected to the extruders. It is in fact possible, and provided according to a preferred embodiment, that the head housing is detachably connected to the extruder, but the connection is generally configured so that it does not have to be released for changing the injection moulding tool.

It is favourable if the extrusion head is equipped such that a solid tyre strip is formed. A solid tyre strip does not contain any chambers.

A profile plate is understood to mean in particular a component which is distinctly smaller with respect to one spatial direction, namely the height, than with respect to the other two spatial directions, namely with respect to length and width. It is possible, and constitutes a preferred embodiment, that at least the majority of the distributor plates, in particular all the distributor plates, have a basic cuboid shape.

It is noted that all the extrusion materials leave the extrusion head through the profile plate. The outlet opening of the profile plate acts so as to provide the final shape.

It is favourable if the extrusion materials of the individual extruders differ from one another in at least one characteristic, for example their composition. The tyre strip can then also be designated as a multi-component strip.

In order to be able to manufacture sufficiently complex tyre strips, it is favourable if the injection moulding tool has at least three distributor plates. In order to keep the flow resistance which the distributor plates oppose to the extrusion material, small, it is favourable if the injection moulding tool has a maximum of six distributor plates. In order to achieve a particularly high stability, the head housing is preferably constructed in one piece, which means that no detachably connected parts are present. In particular, the head housing is in one piece, which means that no joints exist.

The distributor plates are preferably arranged one behind the other, which means that the extrusion material flows through the plates successively. Preferably, the material path does not run backwards for any extrusion material, which means that the material path traverses a plate firstly in one direction and then in the opposite direction.

According to a preferred embodiment, at least the majority of the extruders and the head housing are configured so that the screws of the respective extruders (a) are removable by means of a movement of the screw through the head housing or (b) by means of a movement of the screw away from the head housing, while the head housing is stationary relative to the extruders. As large throughputs are necessary in the manufacture of tyre strips, the extruders which are used for this are likewise designed for a high throughput and are accordingly bulky. In addition, large driving outputs must be transferred to the shafts of the extruders, for which reason it has become established in tyre strip extrusion apparatuses that the screws of the extruders can be removed without having to move the head housing relative to the extruders.

According to a preferred embodiment, the tyre strip extrusion apparatus has at least seven extruders. Such a number of extruders can not be constructed with hitherto existing extrusion heads, because the multiplicity of channels for the extrusion materials requires a multiplicity of foldable tool inserts, wherein these tool inserts must have pivot axes which are respectively aligned more precisely to one another.

It is particularly favourable if the head housing has at least seven feed openings, and each extruder is connected to precisely one feed opening.

In order to achieve as high a throughput as possible, in particular a throughput of more than 1500 kg per hour, it is favourable if all the extruders have an extruder screw diameter of at least 90 millimetres. The extruder screw diameter is the diameter of the extruder screw or of the extruder screws. According to a preferred embodiment, at least one distributor plate has at least one guide channel, which extends at least partially along a parting surface.

The feature that the guide channel extends along the parting surface is understood in particular to mean that the guide channel is open to a face side, i.e. the parting surface, and/or runs in the interior of the plate along the parting surface, so that the extrusion material flows along the parting surface during operation. When the guide channel is open to a face side on its plate, the extrusion material flowing through this guide channel has, at the same time, contact to the corresponding distributor plate and either an adjacent distributor plate or the head housing.

It is particularly favourable if all the material paths run through all the parting surfaces. In other words, no material path then runs between a narrow side of a distributor plate and the head housing. This means, in turn, that by removing the injection moulding tool generally rubber material is only present at the sites at which the extrusion material coming from the extruder enters into the injection moulding tool. The side faces of the head housing, against which the injection moulding tool bears, on the other hand do not come in contact with the rubber material, so that they also do not have to be cleaned.

It is favourable if at least one distributor plate has a bore, and the guide channel is connected to the bore. The extrusion material can then stream through the bore and flow along the guide channel for example to one, two or more bores of a distributor plate arranged behind this distributor plate in the material flow direction. It is particularly favourable if at least two distributor plates have at least respectively one guide channel. In particular, it is favourable and is provided according to a preferred embodiment, that at least one distributor plate has at least two guide channels. It is pointed out that two or more distributor plates have one or more bores.

According to a preferred embodiment, at least one guide channel at an end facing away from the bore has a branching point into a first channel branch and at least one second channel branch, so that extrusion material flowing out of the bore in the guide channel flows in flow direction downstream of the branching point both into the first channel branch and also into the second channel branch. It is favourable if at least one guide channel has three channel branches. It is then possible to manufacture tyre strips with complex cross-sections, wherein the number of the individual segments in the cross-section of the tyre strip is greater than the number of extruders necessary for the production of the tyre strip. Thus, for example, extrusion material originating from an extruder can be extruded at two regions of the cross-section of the tyre strip which are spaced apart from one another and separated from one another.

It is favourable if the outlet opening has a cross-sectional area of at least 1000 square millimetres, in particular at least 1500 square millimetres. As already stated above, such large cross-sections require particularly efficient extruders, so that the described problems occur, which are overcome by the invention.

It is favourable if the distributor plates are configured so as to be insertable into the head housing through a translation movement. In other words, a pivoting movement is unnecessary. The injection moulding tool can thus be removed and inserted again in a particularly simple manner.

It is favourable if a majority of the extruders has a screw diameter of a maximum of 150 millimetres, in particular a maximum of 120 millimetres. With a high counterpressure, small screw diameters lead to a higher efficiency than large screw diameters. Although therefore a high throughput is required, it is advantageous in the use of the distributor plates, to use extruders with comparatively small screw diameters.

If is favourable if a deviation between the maximum screw diameter of all extruders and the mean value of all screw diameters is a maximum of 30 millimetres. There, a strip with similar proportions of the individual extrusion materials at the cross-section of the tyre strip can be produced in an energy-efficient manner. The comparatively small difference of the screw diameters of the extruders from one another leads to the extruders being able to be operated comparatively simply at the same working point, which leads to an energy-efficient operation mode of the tyre strip extrusion apparatus. In addition, it is favourable if the difference between the minimum screw diameter of all extruders and the mean value of all screw diameters is a maximum of 30 millimetres.

It is favourable if at least the majority of all the extruders has the same screw diameter. Of course, it is not necessary for the screw diameters to be identical in the mathematical sense. Rather, it is sufficient that the screw diameters differ from one another so little that they can be regarded as being identical. In particular, differences of three percent are tolerable. With respect to a screw diameter of 90 millimetres, this means that the smallest screw diameter can differ from the greatest screw diameter by circa five millimetres. It is advantageous in identical screw diameters that the tyre strip extrusion apparatus is easy to regulate and is able to be operated in an energy-efficient manner.

It is favourable if at least the majority of the distributor plates has a centering device for the form-fitting aligning of adjacent distributor plates. This can involve projections and/or recesses, for example.

The tyre strip extrusion apparatus preferably comprises a fixing device for fixing the distributor plates to the head housing. This can involve here a mechanical and/or hydraulic fixing device.

In the manufacturing of tyre strips with a plurality of extruders, it is necessary to arrange these as efficiently as possible around the extrusion head. It has been found that it is advantageous to arrange the extruders so that the projections of at least two screw longitudinal axes flow onto the horizontal plane in an angle of at least 45°. In other words: the extruders are preferably arranged in a fan-shaped manner around the extrusion head, therefore the distance is kept short which the extrusion material has to cover after leaving the screw, which reduces the necessary driving output for the extruder.

It is advantageous if the head housing has a rear wall which is curved in a convex manner, which faces the extruders. It is then possible that the feed between the extruders and the extrusion head is applied at an angle which deviates only slightly from 90°. The assembly is thus simplified.

It is favourable if the feed openings are arranged in a two-dimensional pattern. The feature that the feed openings are arranged in a two-dimensional pattern is understood to mean in particular that for a bounding rectangle, therefore a rectangle of minimal area, which surrounds all feed openings, it applies that all the side lengths are greater than 1.3 times, in particular twice, particularly preferably of the mean screw diameter. Preferably, the feed openings are arranged along lines which are offset to one another. When the feed openings are arranged on a curved surface, the bounding rectangle is a rectangle on this curved surface.

According to a preferred embodiment, the tyre strip extrusion apparatus comprises a distributor plate tempering device, for bringing at least one distributor plate to a predetermined temperature.

In a method according to the invention, the output of tread strips is preferably at least 2500 kilograms per hour. Alternatively, an output of side strips is at least 1000 kilograms per hour. Instead of output, one could also speak in terms of throughput.

BRIEF DESCRIPTION OF THE DRAWING

The invention is explained in further detail below with the aid of the enclosed drawings. There are shown.

DETAILED DESCRIPTION OF PREFERRED EMBODIMENTS

Figure 1:
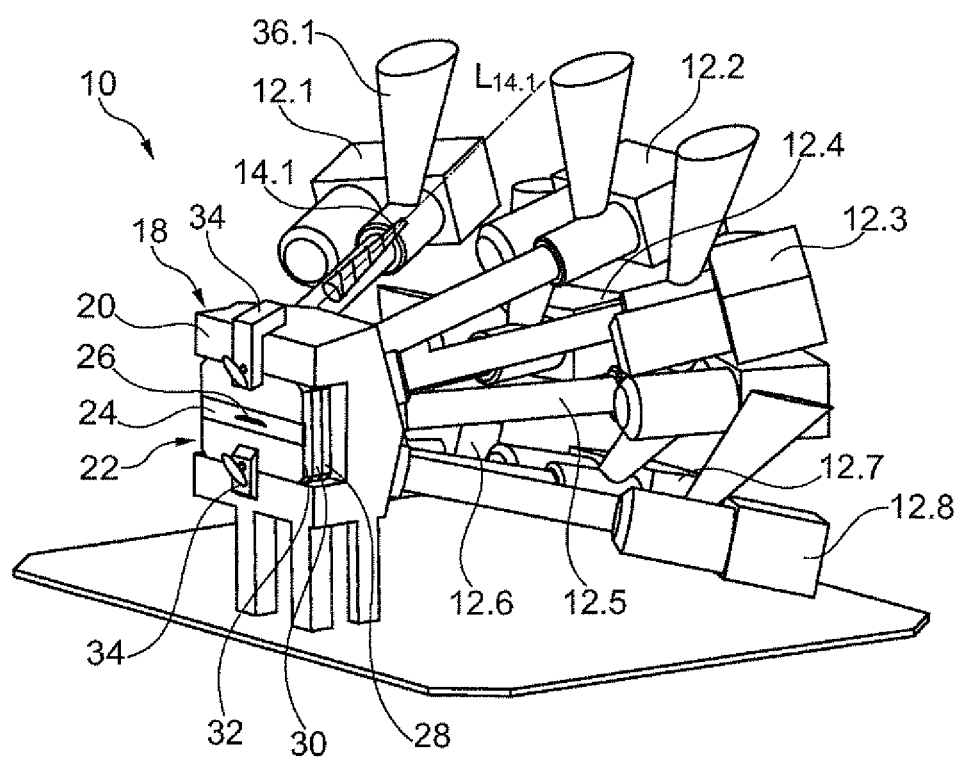
FIG. 1 a three-dimensional diagrammatic partial view of a tyre strip extrusion apparatus according to the invention, FIG. 2 the tyre strip extrusion apparatus according to FIG. 1, in which the injection moulding tool has been removed from the extrusion head, FIG. 3 the injection moulding tool of the tyre strip extrusion apparatus of FIGS. 1 and 2, FIG. 4 the injection moulding tool according to FIG. 3 with removed profile plate, FIG. 5 two distributor plates of the injection moulding tool according to FIGS. 3 and 4, wherein the last distributor plate with respect to the material flow direction has been removed, and FIG. 6 the foremost distributor plate of the injection moulding tool with respect to a material flow direction.

FIG. 1 shows a tyre strip extrusion apparatus 10 according to the invention, which has a first extruder 12.1, a second extruder 12.2, a third extruder 12.3, a fourth extruder 12.4, a fifth extruder 12.5, a sixth extruder 12.6, a seventh extruder 12.7 and an eighth extruder 12.8. Each extruder 12.$i$ ($i$=1, 2, ..., 8) has a first screw 14.$i$, drawn diagrammatically, wherein only the screw 14.1 is drawn in FIG. 1.

The screw 14.1 extends along a screw longitudinal axis $L_{14.1}$. It can be seen that in the present case, all screw longitudinal axes $L_{14.i}$ run through an extrusion head 18. The extrusion head 18 comprises a head housing 20 and an injection moulding tool 22. The injection moulding tool 22 comprises a profile plate 24, on which an outlet opening 26 is formed. The outlet opening 26 gives the tread- or side strip which is to be manufactured its final contour.

FIG. 1 shows that the injection moulding tool 22 has a first distributor plate 28, a second distributor plate 30 and a third distributor plate 32. In the present case, the profile plate 24 is fastened to a third distributor plate 32, pushed in, for example. A fixing device 34 is drawn diagrammatically, which in the present case clamps the injection moulding tool 22 on the head housing 20 mechanically, for example by means of a toggle.

In operation, each extruder 12.$i$ feeds extrusion material in the form of rubber, which is fed to the extruder 12.$i$, through a feed device 36.$i$, for example a feed hopper, along a material path to the injection moulding tool 22.

Figure 2:
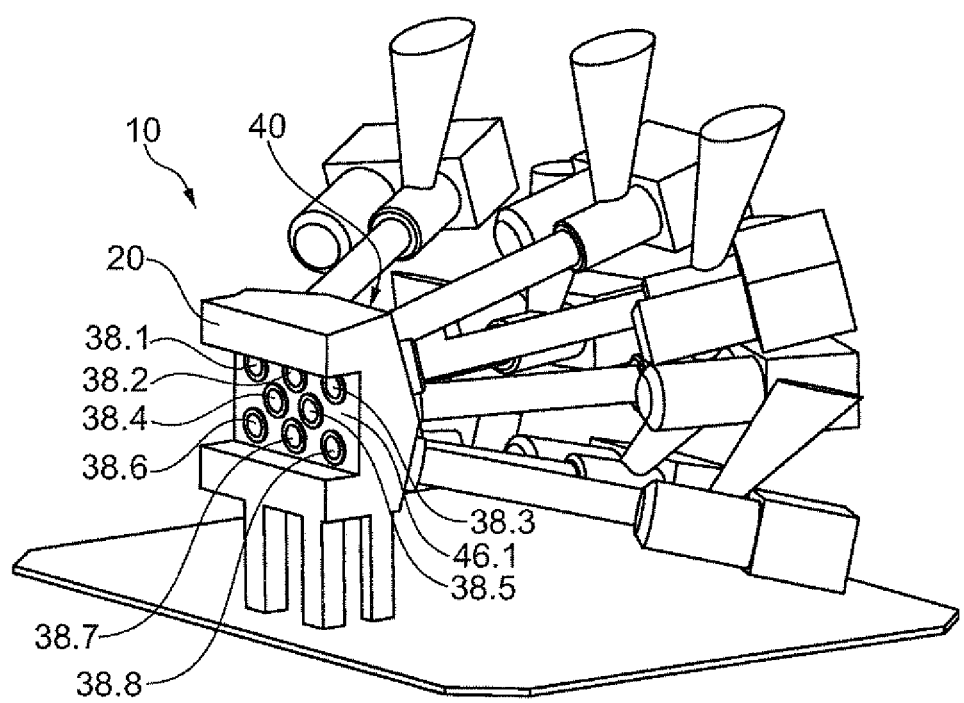

FIG. 2 shows the tyre strip extrusion apparatus 10, in which the injection moulding tool 22 (cf. FIG. 1) is removed. The head housing 20 has a plurality of feed openings 38.$i$, through which, during operation, extrusion material flows from the extruders 12.$i$. It can be seen that the head housing 20 has a rear wall 40, which faces the extruders 12.$i$ and has a convex shape. It can be seen in addition that the feed openings 38.*i* are arranged in a two-dimensional pattern, in the present case namely in the form of three rows running parallel to one another.

On the side which faces the first distributor plate 28, a first parting surface 46.1 is formed. The first distributor plate 28 bears against this parting surface 46.1 during operation.

Figure 3:
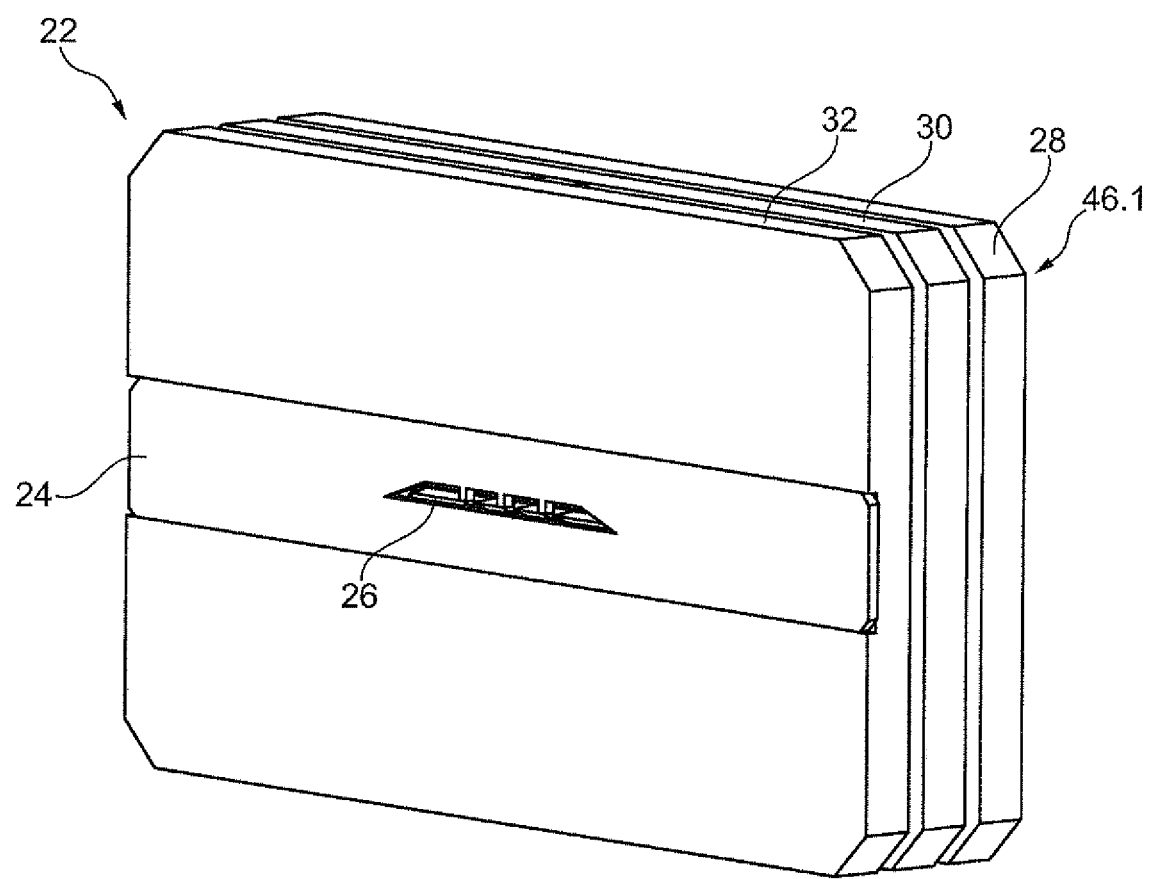

FIG. 3 shows the injection moulding tool 22. In the present case, the outlet opening 26 has a cross-sectional area of 2000 square millimetres.

Figure 4:
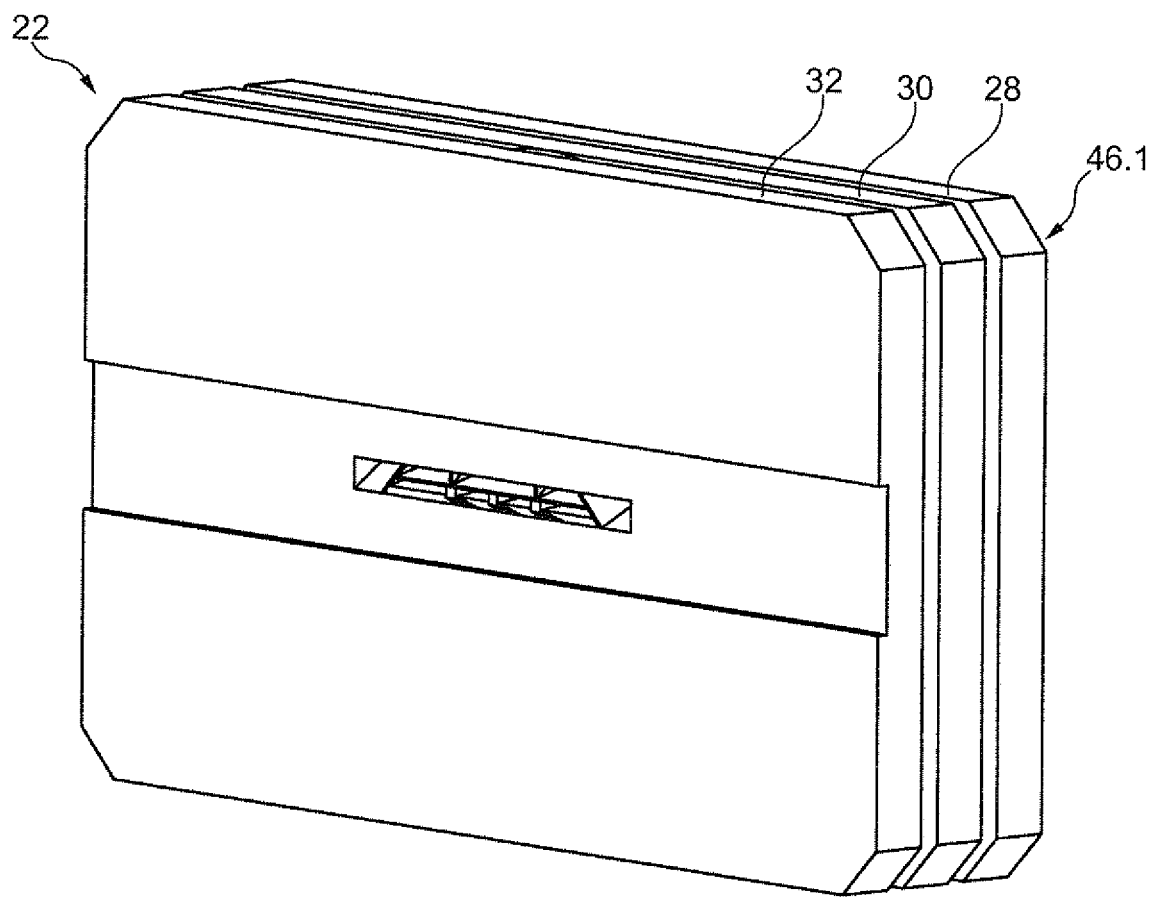

FIG. 4 shows the injection moulding tool 22 without profile plate. It can be seen that upstream of the outlet opening 26 in the material flow direction (cf. FIG. 3) a plurality of channels are arranged, through which respectively extrusion material flows, in order to become connected at the outlet opening 26 to a tyre strip.

Figure 5:
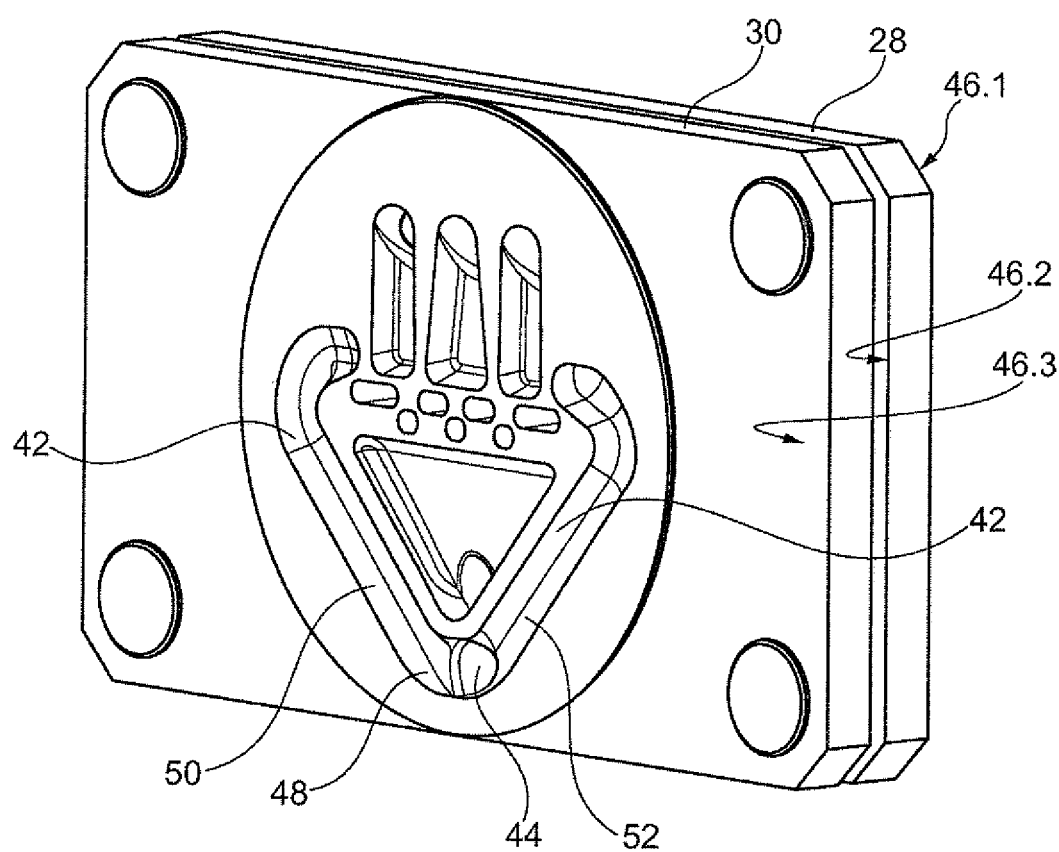

FIG. 5 shows the second distributor plate 30 in detail. It can be seen that the second distributor plate 30 has a guide channel 42, which is connected with a bore 44. A second parting surface 46.2 is formed between the first distributor plate 28 and the second distributor plate 30. A third parting surface 46.3 is formed between the second distributor plate 30 and the third distributor plate 32. The guide channel 42 extends along the third parting surface 46.3, which in the present case is connected by a wide side with the second distributor plate 30.

The guide channel 42 has a branching point 48, which in the present case is arranged in the region of the bore 44. In the branching point, the guide channel 42 splits into a first channel branch 50 and a second channel branch 52.

Figure 6:
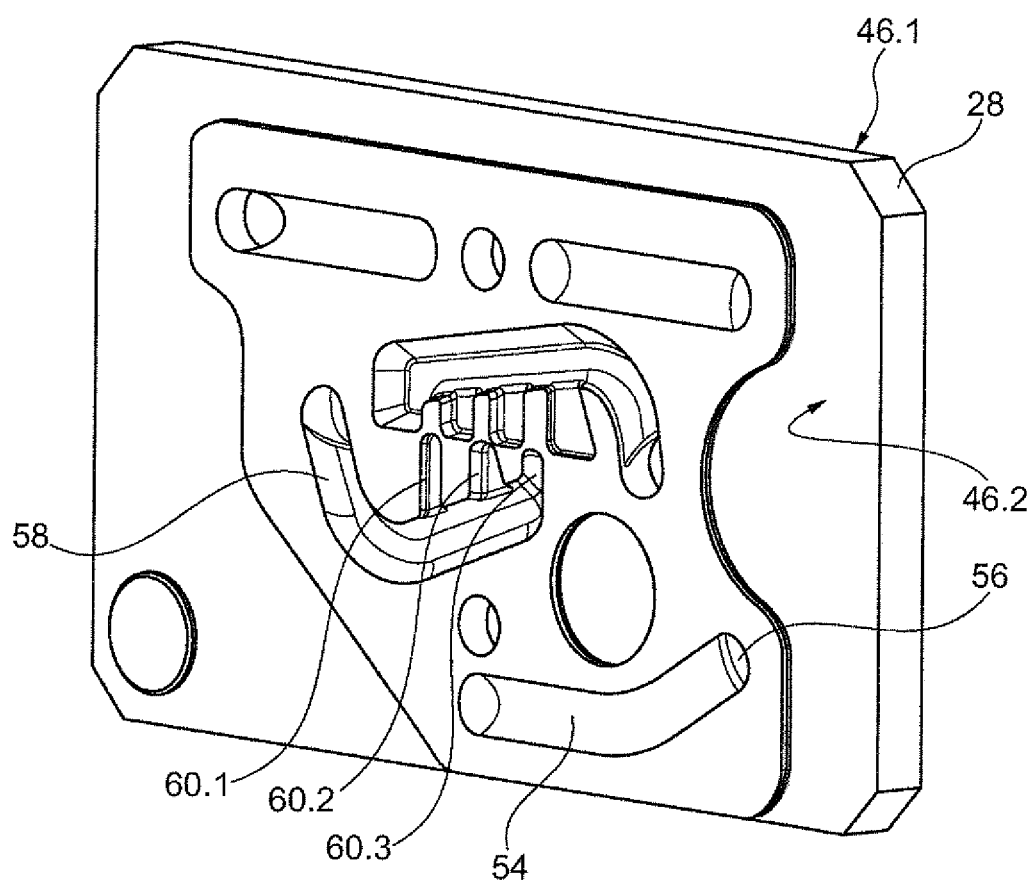

FIG. 6 shows the first distributor plate 28. It can be seen that the bore 44 (cf. FIG. 5) is connected to a second guide channel 54, which is supplied with extrusion material via a second bore 56.

It can be seen that the first distributor plate 28 has a third guide channel 58, which branches into three channel branches 60.1, 60.2, 60.3.

The invention claimed is:

1. A tyre strip extrusion apparatus for producing a tread and/or side strip for a tyre, comprising:
    a first extruder including a first screw which defines a first longitudinal axis;
    a second extruder including a screw which defines a second longitudinal axis;
    a third extruder including a screw which defines a third longitudinal axis;
    a fourth extruder including a screw which defines a fourth longitudinal axis;
    an extrusion head including a head housing having at least four feed openings which are connected to the first, second, third and fourth extruders in one-to-one correspondence for feed of extrusion material; and
    an extrusion moulding tool connected to the head housing, said extrusion moulding tool including a profile plate formed with an outlet opening which communicates with the feed openings so as to enable extrusion material to flow from the feed openings along respective material paths to the outlet opening for extruding a web from the extrusion material, a first distributor plate which bears against the head housing along a first parting surface, and a second distributor plate which is arranged upstream of the profile plate in a flow direction of the extrusion material, with the first distributor plate bearing against the second distributor plate along a second parting surface, said first and second distributor plates configured such that at least a majority of the material paths runs through the first and second parting surfaces,
    wherein the second distributor plate has a first guide channel which extends at least partially along a third parting surface of the second distributor plate downstream the second parting surface,
    wherein the second distributor plate has a bore, said first guide channel being connected to the bore,
    wherein the first guide channel has at an end facing away from the bore a branching point into a first channel branch and a second channel branch, so that extrusion material flowing out from the bore in the first guide channel flows in the flow direction downstream of the branching point into the first channel branch and into the second channel branch,
    wherein, at least partially along the second parting surface, the first distributor plate has a second guide channel connected to the bore and a third guide channel having three branches.

2. The tyre strip extrusion apparatus of claim 1, wherein the screws of a majority of the first, second, third and fourth extruders are removable in the respective ones of the first, second, third and fourth extruders by moving the screws through the head housing or by moving the screws away from the head housing, while the head housing is stationary in relation to the first, second, third and fourth extruders.

3. The tyre strip extrusion apparatus of claim 1, further comprising fifth, sixth and seventh extruders, with the head housing having at least seven of said feed openings for connection to the extruders in one-to-one correspondence.

4. The tyre strip extrusion apparatus of claim 1, wherein all the material paths run through the first and second parting surfaces.

5. The tyre strip extrusion apparatus of claim 1, wherein the first and second distributor plates are configured for insertion into the head housing by a translation movement.

6. The tyre strip extrusion apparatus of claim 1, wherein at least a majority of the first, second, third and fourth extruders has a screw diameter of a maximum of 150 millimetres.

7. The tyre strip extrusion apparatus of claim 1, wherein at least a majority of the first, second, third and fourth extruders has a screw diameter of a maximum of 120 millimetres.

8. The tyre strip extrusion apparatus of claim 1, wherein the first, second, third and fourth extruders are arranged such that projections of at least two of the first, second, third and fourth longitudinal axes onto a horizontal plane define an angle of at least 45°.

9. The tyre strip extrusion apparatus of claim 1, wherein the feed openings are arranged in a two-dimensional pattern.

10. A method for producing a tread or side strip of a tyre, comprising feeding extrusion material through an outlet opening of an extrusion moulding tool in communication with feed openings of an extrusion head in communication with at least four extruders at an output of tread strips of at least 2500 kilograms per hour and/or an output of side strips of at least 1000 kilograms per hour, with the extrusion moulding tool including a profile plate formed with the outlet opening, a first distributor plate which bears along a first parting surface against a head housing of the extrusion head, and a second distributor plate which is arranged upstream of the profile plate in a flow direction of the extrusion material, with the first distributor plate bearing along a second parting surface against the second distributor plate, said first and second distributor plates configured such that at least a majority of material paths from the feed openings to the outlet opening runs through the first and second parting surfaces, wherein the second distributor plate has a first guide channel which extends at least partially along a third parting surface of the second distributor plate downstream the second parting surface, wherein the second distributor plate has a bore, said first guide channel being connected to the bore, wherein the first guide channel has at an end facing away from the bore a branching point into a first channel branch and a second channel branch, so that extrusion material flowing out from the bore in the first guide channel flows in the flow direction downstream of the branching point into the first channel branch and into the second channel branch, wherein, at least partially along the second parting surface, the first distributor plate has a second guide channel connected to the bore and a third guide channel having three branches.

11. The method of claim 10, wherein the at least four extruders include screws and the screws of a majority of the extruders are removable by moving the screws through the head housing or by moving the screws away from the head housing, while the head housing Is stationary in relation to the extruders.

12. The method of claim 11, wherein at least a majority of the screws have a screw diameter of a maximum of 150 millimetres.

13. The method of claim 11, further comprising arranging the extruders such that projections of at least two of longitudinal axes, defined by the screws, onto a horizontal plane define an angle of at least 45°.

14. The method of claim 10, further comprising moving the first and second distributor plates translatorily for insertion into the head housing.

* * * * *